United States Patent [19]

van Turnhout et al.

[11] 4,355,089

[45] Oct. 19, 1982

[54] PROCESS FOR PRODUCING A PHOTOCONDUCTIVE POLYIMIDE COATING UPON A SUBSTRATE

[75] Inventors: Jan van Turnhout, Pijnacker; Ramesh C. Ahuja, Delf; both of Netherlands

[73] Assignee: Nederlandse Organisatie Voor Toegepast-Natuurwetenschappelijk Onderzoek Ten Behoeve Van Nijverheid, Handel En Verkeer, Delft, Netherlands

[21] Appl. No.: 931,919

[22] Filed: Aug. 8, 1978
(Under 37 CFR 1.47)

[30] Foreign Application Priority Data

Aug. 9, 1977 [NL] Netherlands .......................... 7708786

[51] Int. Cl.³ .............................................. C08G 63/04

[52] U.S. Cl. ...................................... 430/130; 430/83; 430/136; 528/274; 528/289; 528/292

[58] Field of Search ................. 96/1.5 R, 1.6; 430/83, 430/130

[56] References Cited

U.S. PATENT DOCUMENTS

| | | | |
|---|---|---|---|
| 3,533,785 | 10/1970 | Fox et al. | 96/1.5 R |
| 3,554,744 | 1/1971 | Maas | 96/1.5 R |
| 3,787,207 | 1/1974 | Hasegawa et al. | 96/1.5 R |

FOREIGN PATENT DOCUMENTS

| | | | |
|---|---|---|---|
| 7501644 | 8/1975 | France . | |
| 43-24754 | 10/1968 | Japan | 96/1.5 R |
| 1150435 | 4/1969 | United Kingdom . | |

*Primary Examiner*—Roland E. Martin, Jr.
*Attorney, Agent, or Firm*—Cushman, Darby & Cushman

[57] ABSTRACT

A photoconductive layer is produced upon a substrate by coating the substrate with a solution in an organic solvent of a polyamic acid and of 2,4,7-trinitro-9-fluorenone (TNF) and/or 2,3,4,7-tetranitro-9-fluorenone and heating the coated substrate at a temperature not exceeding 150° C. to form on the substrate a polyimide coating containing the said fluorenone compound as a photosensitizer.

5 Claims, 8 Drawing Figures

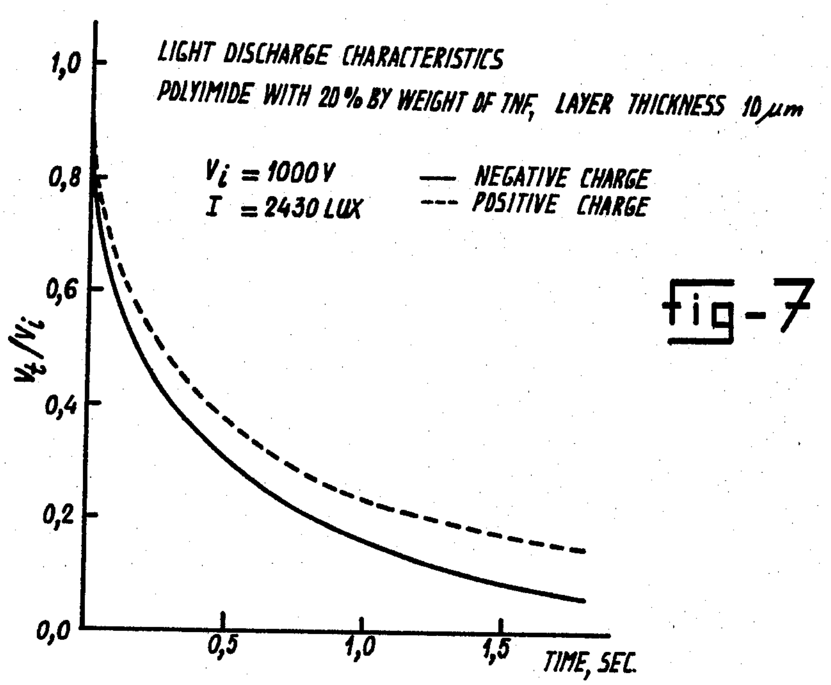
FIG-7
FIG-8
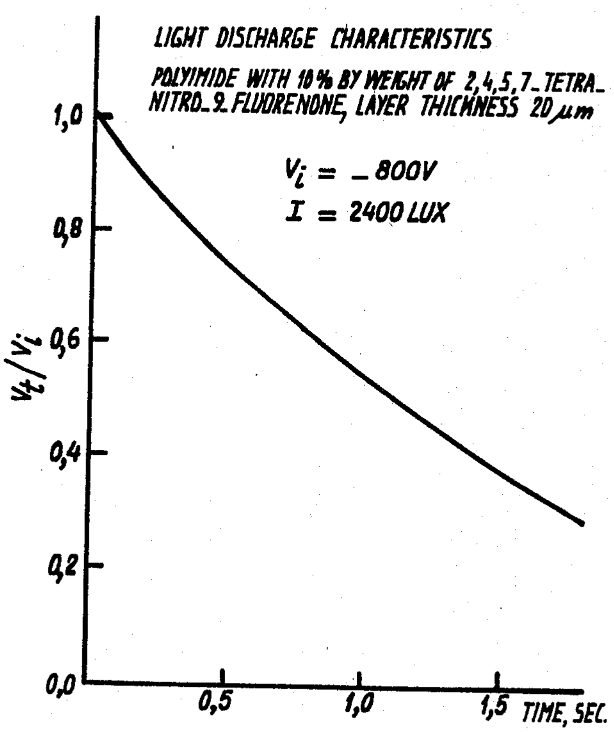

PROCESS FOR PRODUCING A PHOTOCONDUCTIVE POLYIMIDE COATING UPON A SUBSTRATE

BACKGROUND OF THE INVENTION

In the xerographic method of electrophotography the free surface of a photoconductive material, such a amorphous selenium, $As_2Se_3$, ZnO or a sensitized polymer, which is supported by a substrate that conducts electricity rather well, is corona-charged to a certain surface potential. Subsequently the charged surface is exposed to a light and dark image formed by reflection of light from a document to be copied. On the dark places the charge remains, whereas on the illuminated places a reduction of the surface potential takes place due to a photocurrent normal to the surface. The resulting distribution of the surface potential replicates the light and dark places of the document. The electrostatic image formed is then developed by e.g. applying a toner with an opposite charge on the surface with the electrostatic image. On the charged places the toner adheres, whereas on the other places it does not adhere, so that a toner image is formed which may be reproduced e.g. on paper.

From the above it is clear that a satisfactory electrophotographic coating must accept charge readily, must retain its charge on the non-illuminated places (i.e. it must have a low dark decay), must loose its charge rapidly and as completely as possible on the illuminated places (i.e. it must have excellent light discharge characteristics) and must give a uniform photoresponse in the entire visible region and on all parts of the coating. Moreover, the coating must be suitable for frequent use, must adhere well to the substrate and must be resistant to abrasion and scratching.

As a substrate among others metals, such as aluminium, and paper are used.

Numerous literature places describe photoconductive materials. More recently polyimides have been described for this purpose (U.S. Pat. No. 3,554,744, Japanese patent publication 24.754/68, Japanese patent applications 73.43145 and 74.11591 and Research Disclosure, nr. 105, January 1973, article 10503). However, it appeared in practice that these polyimides are not satisfactory, because their photosensitivity is insufficient, especially in the visible region.

A more promising development has been described in the U.S. Pat. No. 3,484,237 and an article of R. M. Schaffert in IBM J. Res. Develop., January 1971, pages 75–89, which publications disclose a photoconductor consisting of poly-N-vinylcarbazole containing 2,4,7-trinitro-9-fluorenone (TNF). Preferably one molecule of the TNF is used for one monomer unit of N-vinylcarbazole. These publications describe that for said compositions having an 1:1 molar ratio the photosensitivity is greater and the dark decay is slower for negative corona charging than for positive corona charging. However, with a decreasing TNF content, the positive charge acceptance increases and the negative charge acceptance decreases. The cross over point occurs at a TNF concentration of about 0.06 (mole of TNF per monomer unit of N-vinylcarbazole), which corresponds to about 10% by weight of TNF, based on the poly-N-vinylcarbazole.

The U.S. Pat. Nos. 3,408,185 and 3,408,189, respectively, describe the use of Lewis acids, among which 2,4,7-trinitro-9-fluorenone is one of the preferred compounds, as photosensitizers in polyurethane resins and melamine resins respectively. They also show that the addition of a Lewis acid to an inert resin, such as an ethylmethacrylate resin, does not result in photosensitive response.

British Pat. No. 1,150,435 describes a process for preparing a photoconductive material by contacting an organic polymeric resinous film, which is capable of retaining an electrostatic charge in the absence of actinic radiation, with a solution containing an impregnation agent which imparts photoconductivity to the film, the solvent in said solution being substantially inert with respect to said film, but being capable of dissolving the impregnation agent. Thereby the impregnation agent is dispersed into at least a portion of the film and the impregnation is continued until the desired degree of photoconductivity is imparted to said film. In one of the examples a solution of 2,4,7-trinitrofluorenone in benzene is refluxed in contact with a polyimide film upon an aluminium substrate. The impregnated film is dried, charged to 1000 Volts by means of a corona discharge device and then exposed to a light and shadow pattern by means of a high pressure mercury vapor lamp. However, when repeating this experiment it has been found that hardly any TNF has been incorporated into the polyimide film and that the resulting film did not show any photosensitivity upon exposure to a light source in the visible region.

BRIEF DESCRIPTION OF THE INVENTION

Surprisingly it has been found that a very good photoconductive coating could be obtained upon a substrate by coating the substrate with a solution in an organic solvent of a polyamic acid having recurring units of the formula 2, in which R is a tetravalent organic radical containing at least two carbon atoms, no more than two carbonyl groups being bonded to anyone carbon atom of R, $R_1$ represents a divalent organic radical having at least two carbon atoms, which is bonded to two nitrogen atoms, the said nitrogen atoms being attached to different carbon atoms of said divalent radical, and R, $R_1$ or both contain at least one aromatic ring of six carbon atoms, as well as of a member of the group consisting of 2,4,7-trinitro-9-fluorenone (TNF) and 2,4,5,7-tetranitro-9-fluorenone in an amount of 1–50% by weight, based on the polyamic acid, and heating the coated substrate at a temperature not exceeding 150° C. to form on the substrate a polyimide coating containing a photosensitizer.

The advantages of the photoconductive coating as produced according to the invention are numerous. Upon exposure to light in the visible region the coating loses its charge rapidly and shows a very good photosensitivity. This is surprising because the polyimide itself shows a very low photosensitivity in the visible region and the combination of TNF and polyimide as produced according to the abovementioned British patent specification No. 1,150,435 appeared to be not satisfactory too. Thus, for illumination of the charged photoconducting coating no UV-light is necessary which has the advantage that the discharge is less dangerous to the eyes of the operator and degradation of the polymers is avoided.

In view of the fact that many modifications in the polyimide polymer chain may be made within the scope of the invention it becomes feasible to shift the spectral sensitivity of the photoconductive coating by the combination of the polyimide and the TNF or the corresponding tetranitro compound. This makes it possible to adapt the properties of the coating to the desired purposes, so that the photoconductive coating of the invention is excellently suitable for colour reproduction. Moreover, due to the high photosensitivity a very fast light discharge takes place with a smaller amount of light than used heretofore. Finally, polyimide has a higher glass transition temperature than other polymers, such as the abovementioned poly-N-vinylcarbazole. Thus, its tendency to crystallization is much smaller, which is advantageous, in as much as crystallization leads to charge transport barriers in the coating.

BRIEF DESCRIPTION OF THE DRAWINGS

FIG. 7 is a graph showing the light discharge characteristics of a 20% TNF 10 micron polyimide layer where subjected to negative and positive charges; and FIG. 8 is a graph showing the light discharge characteristics of a polyimide containing 10%, 2,4,5,7-tetranitro-9-fluoreuone.

DESCRIPTION OF THE PREFERRED EMBODIMENTS

Figure 1:
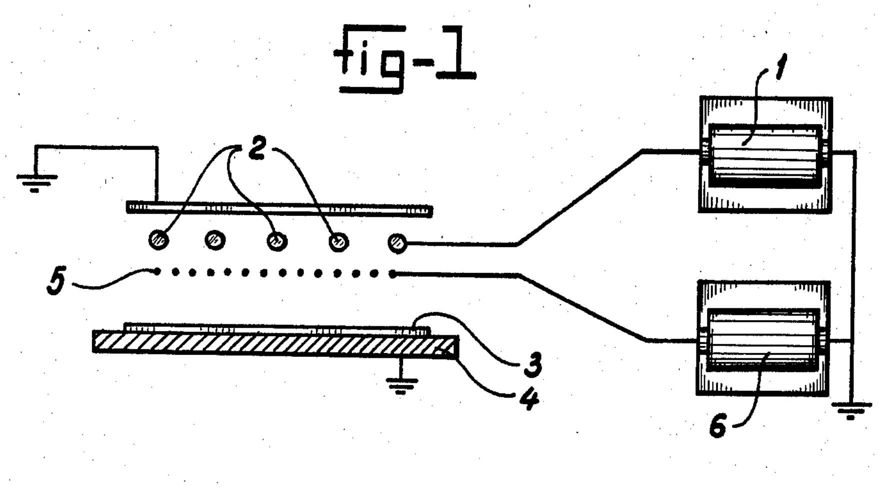
FIG. 1 is an illustration of a device used for determining the charge acceptance of the polyimide coating on an aluminum plate.

The method of preparing the polyimide coating starting with a polyamic acid solution of the type described in the above is known from the U.S. Pat. Nos. 3,179,633, 3,179,634 and 3,554,744 and the article of C. E. Sroog in J. Polymer Science: Macromolecular Reviews, vol. 11 (1976), pages 161-208 and many of the literature places cited in that article. For further details reference is made to said publications. In general the polyimides used have recurring units of the formula 1

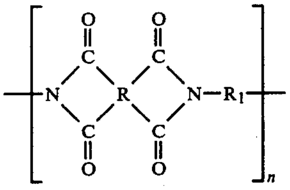

in which R and $R_1$ have the above meaning and n indicates the number of recurring units. Preferably, said number is such that the polyimides have an inherent viscosity of at least 0.1 measured as a 0.5% solution in concentrated sulfuric acid at 30° C. as indicated in the U.S. Pat. No. 3,554,744. They are prepared by using a polyamic acid having recurring units of the formula 2

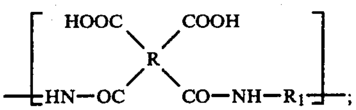

Such a polyamic acid may be prepared from dianhydrides of the formula 3

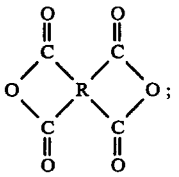

and diamines of the formula 4 $H_2N—R_1—NH_2$. It goes without saying that in addition to polyimides also copolyimides may be used which are obtained by the use of more than one diamine and/or more than one tetracarboxylic acid or dianhydride respectively.

The concentration of the polyamic acid in the solution in the organic solvent is preferably between 10 and 30% by weight depending somewhat on the viscosity of the polyamic acid solution. Anyhow, the solution must be suitable to be applied upon the substrate.

As organic solvents those solvents are suitable, which show a good dissolving power both for the photosensitizers and for the polyamic acid. Preferably, N-methylpyrrolidone-2 is used.

The way of applying the solution upon the substrate has also been disclosed in the literature describing the preparation of the polyimides.

Preferably, the heating of the polyamic acid solution upon the substrate is carried out at a temperature of 85°-120° C. and especially 90°-110° C. for a period sufficient to form the polyimide, e.g. 10 hours or more.

Preferably, TNF is used as the photosensitizer. It has the formula 5

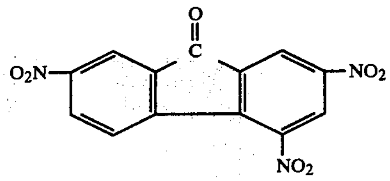

and can be obtained commercially.

The concentration of the fluorenone compound in the polyamic acid solution is preferably 12-30% by weight and especially 15-20% by weight based on the polyamic acid. Most preferred is the use of one molecule of TNF or the corresponding tetranitro compound for one monomeric unit of the polyamic acid. Surprisingly, at the temperatures used the fluorenone compounds do not disturb the cyclisation of the polyamic acid to form the polyimide.

For practical purposes the thickness of the polyimide coatings obtained by applying the polyamic acid solution upon a substrate and heating varies between 5 and 40 μm, but it may be more or less, if desired.

The following examples merely serve to illustrate the invention without limiting its scope.

EXAMPLE 1

Various amounts of TNF were intimately mixed with a solution of 20 grams of a polyamic acid, obtained by the reaction of bis(4-aminophenyl)ether and pyromellitic dianhydride (Sroog, J. Polymer Science: Macromolecular Reviews 11 (1976), page 164; commerical product Pyre ML (RC-5044) of E. I. du Pont de Nemours and Company), in 100 milliliters of N-methylpyrrolidone-2. The resulting product was directly coated on an aluminium plate by means of a scalpel and the coated plate was heated for 18 hours at 100° C. The resulting polyimide contained recurring units of the formula 6

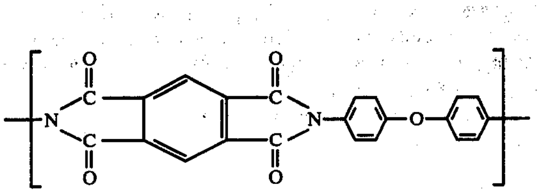

With the resulting coatings a number of experiments was carried out, which are illustrated in the figures of the accompanying drawings.

Figure 2:
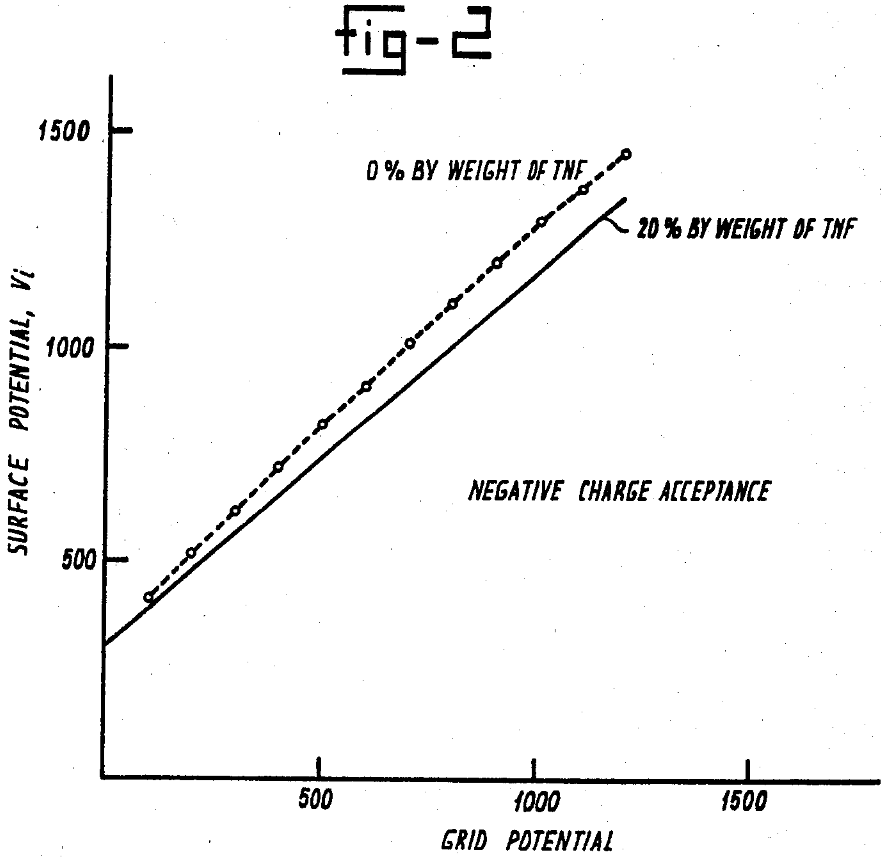
FIG. 2 is a graph showing negative charge acceptance for coatings with and without TNF.
Figure 3:
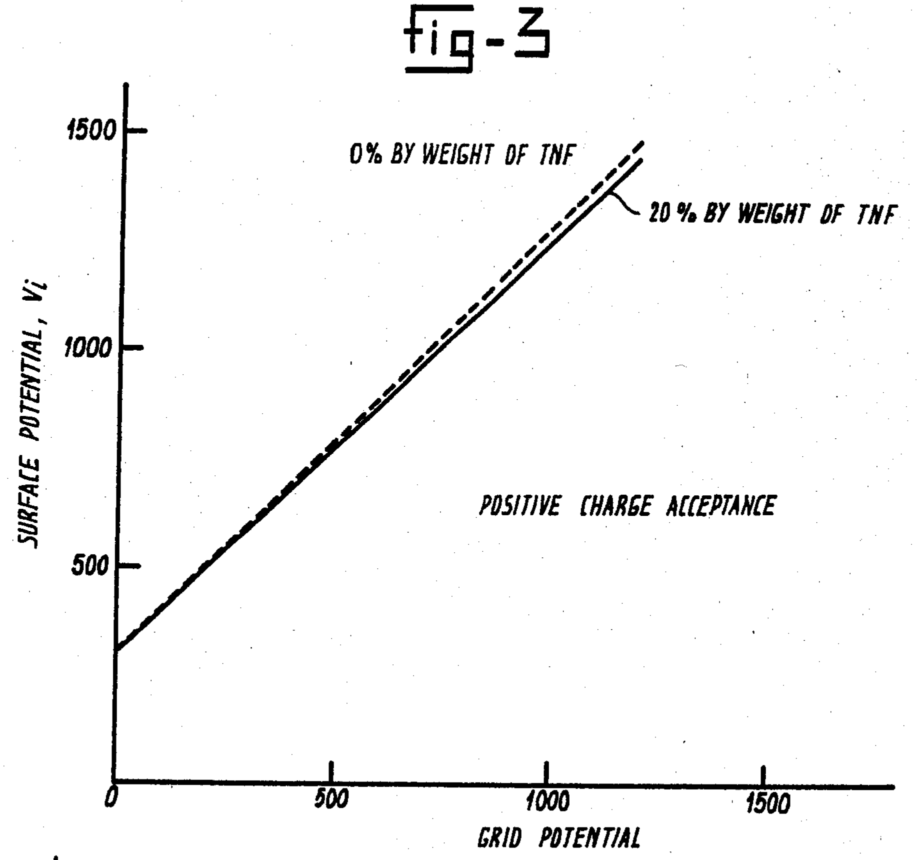
FIG. 3 is a graph showing positive charge acceptance for coatings with and without TNF.

(a) The charge acceptance of the polyimide coating was determined with the apparatus of FIG. 1. By means of a high voltage power supply 1 a corona discharge was effected between the electrodes 2 and the substrate 4, which was coated with the photoconductive coating 3. The corona discharge is controlled by the voltage on the grid 5 obtained by means of power supply 6. As a photoconductive coating a polyimide layer obtained as shown in the above was used both without TNF and with TNF in an amount of 20% by weight, based on the polyamic acid. Both layers had a thickness of 20 μm. The corona potential was maintained constant and the grid potential was varied in order to determine how the surface potential of the coating varied. This appears to increase substantially linearily with the grid potential as appears from the FIGS. 2 and 3. It also appears from these figures that the negative charge acceptance (FIG. 2) and the positive charge acceptance (FIG. 3) do not differ fundamentally. In this respect the photoconductive composition as produced according to the invention is distinguished clearly from the TNF-sensitized poly-N-vinylcarbazole as explained in the above and from selenium, which only accepts a positive charge. Moreover, it appeared that the charging speed, that is the speed with which the sample is passed through the corona discharge apparatus, also influences the charge acceptance properties. At lower charging speed the surface potential is higher.

When using 2,4,5,7-tetranitro-9-fluorenone in the same experiments it has been found that the resulting coatings accept the charge well, albeit somewhat less than when using TNF.

When using p-benzoquinone, p-chloroanil, o-chloroanil, 1,4-dicyanobenzene, picric acid, tetracyanoethylene and 7,7',8,8'-tetracyanoquinone dimethane it was found that coatings obtained therewith have poor electrophotographic characteristics.

Figure 4:
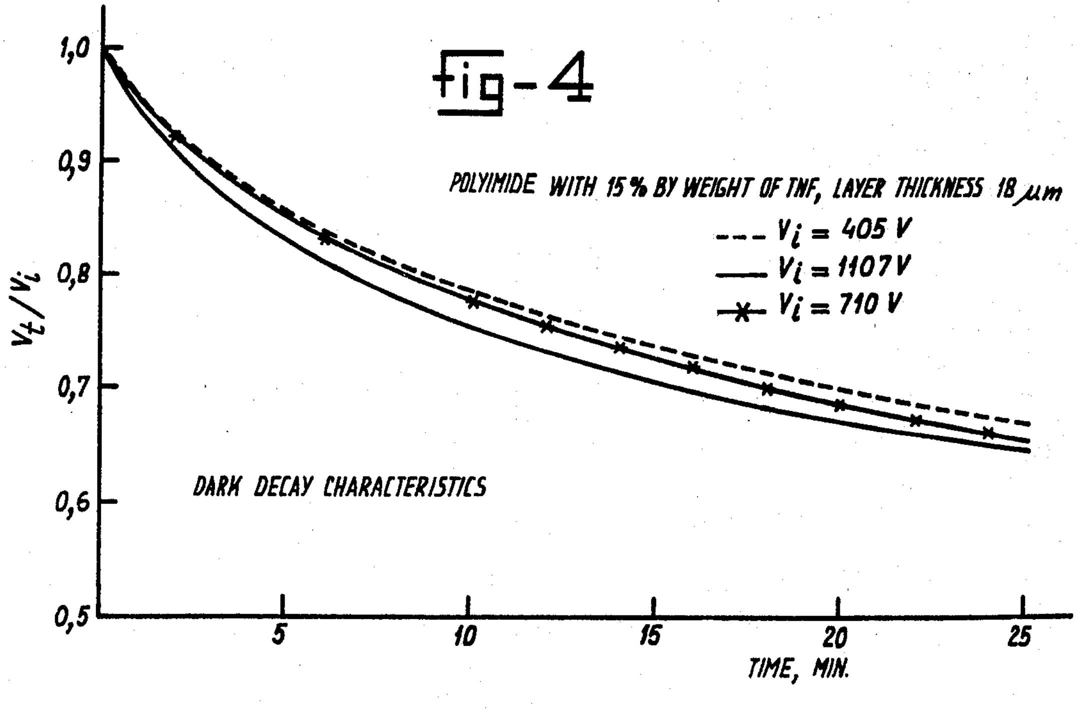
FIG. 4 is a graph showing dark decay characteristics of a polyimide coating containing 15% TNF.
Figure 5:
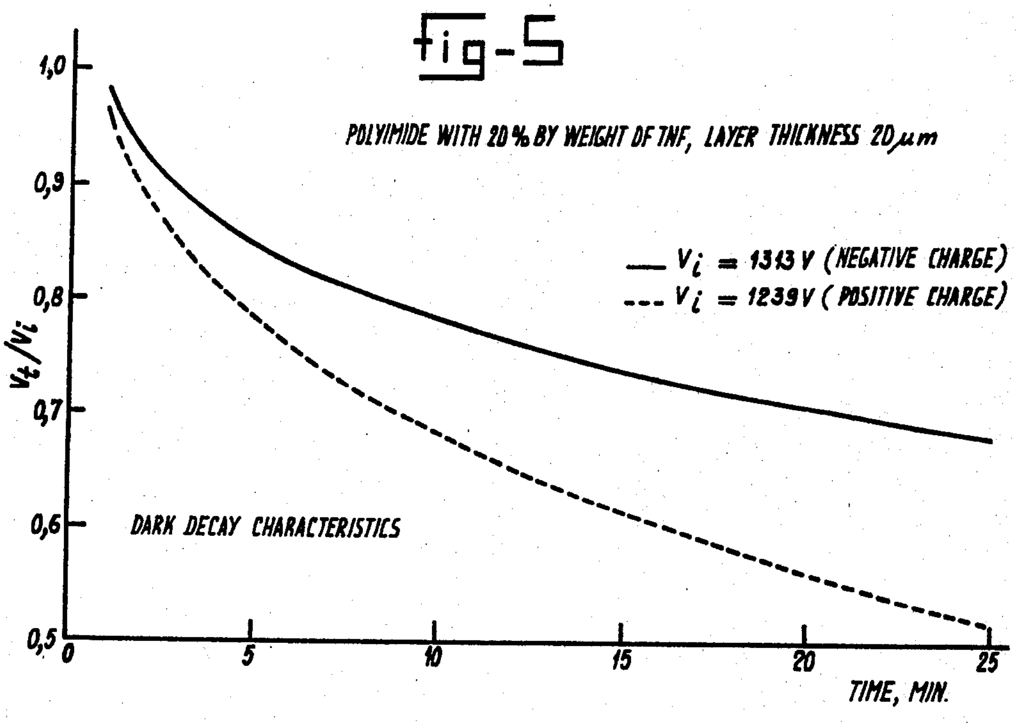
FIG. 5 is a graph showing dark decay characteristics of a polyimide coating containing 20% TNF.

(b) It was determined how the charged photoconductive coating retained its charge in the dark. For determining the dark decay characteristics a coating of the polyimide containing 15% by weight of TNF (based on the polyamic acid) and having a thickness of 18 μm and a coating of the polyimide containing 20% by weight of TNF (based on the polyamic acid) and having a thickness of 20 μm, respectively, were used. In the FIGS. 4 and 5, respectively, the quotient of the surface potential at time t and the initial surface potential ($V_t/V_i$) has been plotted against the time in minutes. In FIG. 4 the decrease of $V_t/V_i$ is shown for a negative charge at three different values of $V_i$. In FIG. 5 the decrease of $V_t/V_i$ is shown for a positive and a negative charge. The measurements were carried out at ambient temperature. It appears from the results obtained that both for a positive charge and for a negative charge the dark decay characteristics are excellent during the periods of time used in normal practice.

Figure 6:
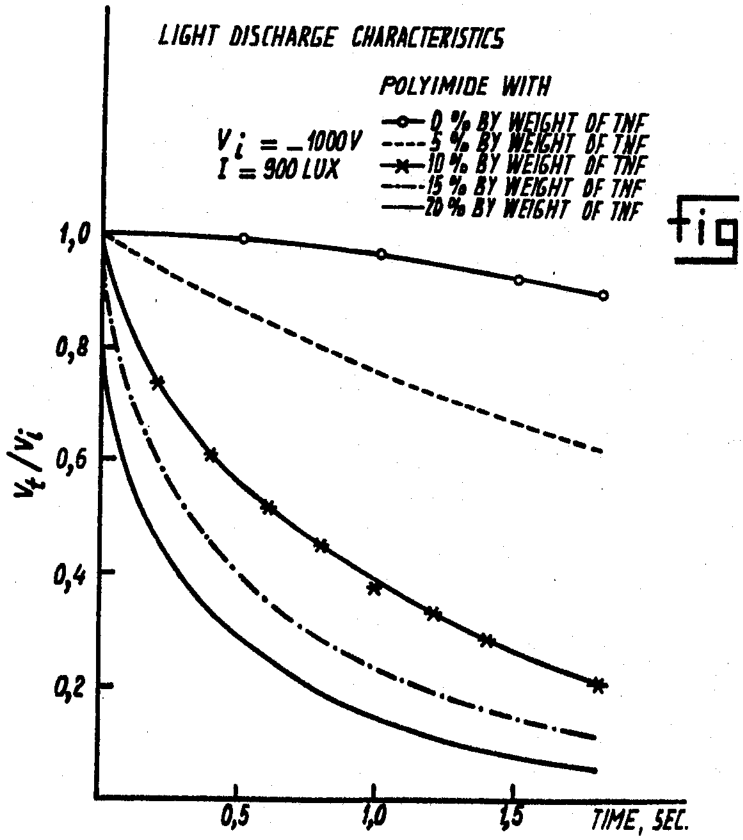
FIG. 6 is a graph showing the light discharge characteristics of various polyimide coatings containing from 0 up to 20% TNF.

(c) The light discharge characteristics of the charged photoconductive coating were determined. Polyimide coatings without TNF (thickness 10 μm), containing 5% by weight of TNF (thickness 10 μm) and containing 10, 15 and 20% by weight of TNF (thickness 12 μm) (all percentages being based on the weight of the polyamic acid), respectively, were illuminated in the visible region with a light source of 900 lux. The initial surface potential ($V_i$) was 1000 Volt; the charge was negative. The results are shown in FIG. 6, in which the quotient $V_t/V_i$ has been plotted against the time in seconds. It appears from FIG. 6 that the polyimide without photosensitizer looses its charge upon illumination insufficiently rapidly, but that especially with increasing contents of TNF a very rapid decrease of the surface potential takes place.

A rapid decrease of the surface potential appears also from FIG. 7, in which $V_t/V_i$ has been plotted against the time in seconds in an experiment with a polyamide coating obtained in the way as described in the above, containing 20% by weight of TNF, based on the polyamic acid, and having a thickness of 10 μm. The light source in the visible region had a strength of 2430 lux. The difference between the loss of negative charge and the loss of positive charge upon illumination appeared to be very small.

EXAMPLE 2

In the way described in example 1 a polyimide coating was formed with the polyimide described in example 1. It had a thickness of 20 μm and contained 10% by weight of 2,4,5,7-tetranitro-9-fluorenone, based on the polyamic acid.

The loss of the negative charge upon illumination of this coating was determined with an initial surface potential ($V_i$) of 800 Volt and a light source of 2400 lux. In FIG. 8 $V_t/V_i$ has been plotted against the time in seconds. A comparison with FIG. 7 (curve with 10% by weight of TNF) shows that the loss of charge upon illumination in the visible region occurs only slightly more rapidly with the use of TNF than with the use of the corresponding tetranitro compound.

We claim:

1. A process for producing upon a substrate a photoconductive coating of polyimide containing as a photosensitizer a member selected from the group consisting of 2,4,7-trinitro-9-fluorenone (TNF) and 2,4,5,7-tetranitro-9-fluorenone, said process comprising:

(1) coating the substrate with a solution in an organic solvent of a polyamic acid having recurring units of the formula:

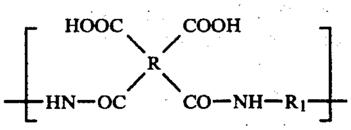

wherein

R is a tetravalent organic radical containing at least two carbon atoms, no more than two carbonyl groups being bonded to anyone carbon atom of R, $R_1$ represents a divalent organic radical having at least two carbon atoms, which is bonded to two nitrogen atoms, the said nitrogen atoms being attached to different carbon atoms of said divalent radical, and R, $R_1$ or both contain at least one aromatic ring of six carbon atoms, as well as of a member of the group consisting of 2,4,7-trinitro-9-fluorenone (TNF) and 2,4,5,7-tetranitro-9-fluorenone in an amount of 1–50% by weight, based on the polyamic acid, and (2) heating the coated substrate at a temperature not exceeding 150° C. to form on the substrate a polyimide coating containing a photosensitizer.

2. The process of claim 1, characterized by heating the solution coated upon the substrate at a temperature of 90° to 110° C.

3. The process of claim 1, characterized by using a polyamic acid solution containing 12–30% by weight of TNF, based on the polyamic acid.

4. The process of the claims 1 and 2, characterized by using a polyamic acid solution containing 15–20% by weight of TNF, based on the polyamic acid.

5. The process of the claims 1 or 3, characterized by heating the solution coated upon the substrate at a temperature of 85°–120° C.

* * * * *

UNITED STATES PATENT AND TRADEMARK OFFICE

CERTIFICATE OF CORRECTION

PATENT NO. : 4,355,089

DATED : October 19, 1982

INVENTOR(S) : Van Turnhout, et al

It is certified that error appears in the above-identified patent and that said Letters Patent are hereby corrected as shown below:

On the title page, Assignee should read:

-- Nederlandse Centrale Organisatie Voor Toegepast-Natuurwetenschappelijk Onderzoek, The Hague, The Netherlands --,

Signed and Sealed this

*Eleventh* Day of *October 1983*

[SEAL]

*Attest:*

GERALD J. MOSSINGHOFF

*Attesting Officer* — *Commissioner of Patents and Trademarks*